Nov. 4, 1941.    G. B. BAILEY    2,261,671
CONTROL MEANS
Filed Aug. 3, 1940    2 Sheets-Sheet 2

George B. Bailey,
Inventor:
By Harry Dexter Beck
Attorney

Patented Nov. 4, 1941

2,261,671

UNITED STATES PATENT OFFICE 2,261,671

CONTROL MEANS

George B. Bailey, Sharon, Mass., assignor to Thermal Engineering Company, Boston, Mass., a corporation of Massachusetts Application August 3, 1940, Serial No. 350,543

7 Claims. (Cl. 290—40)

This invention relates to improvements in control means. More especially it has to do with a novel combination of direct current electric generating equipment and control means whereby the speed of the prime mover or prime movers is varied in accordance with the demand thereon, with the voltage remaining practically constant.

In stationary installations precedent has called for constant speed operation, probably for the reason that there would be no particular advantage in varying the speed of most prime movers such as the steam engine and the steam turbine. The modern, higher speed Diesel engine, however, is inherently a variable speed prime mover and there is every advantage in variable speed operation in accordance with the demand, particularly with changing load conditions calling for relatively high peak demands of short duration, which the average electric power generating problem presents. Higher operating efficiency and lower maintenance costs are obvious results to be obtained and higher speed ratings of the prime mover to take care of the intermittent high demands become practical.

The power capacity of a prime mover is, of course, a direct function of speed and torque. Ordinarily, in an electric generating plant the speed of the prime mover remains constant within the limitations of its governor with the torque exerted varying in accordance with the demand, which leads to relatively inefficient operation under low load or, for that matter, average load conditions where the average load is considerably less than the peak load. It also limits the capacity of a given prime mover to the maximum speed that the manufacturer recommends for continuous operation, whereas the engine may have considerably more reserve power capacity at higher speeds which may be entirely suitable for intermittent operation. Then too the efficiency of an internal combustion engine such as the Diesel engine is primarily a function of the torque and, therefore, to get the most efficient results the ideal conditions would be to keep the prime mover operating at a relatively constant torque, with the speed varying in accordance with the demand.

It is a principal object of this invention to provide electric generating and control means which, within certain limitations, enables one or more prime movers to operate at a substantially constant torque and at variable speeds corresponding to the demand, and which enables the voltage to be maintained substantially constant, regardless of the varying speed of the prime mover or prime movers.

The principles of my invention are herein illustrated in an electric generating plant in which the prime mover is an internal combustion engine and the generator is of the direct current shunt-wound type. The system also embodies control means for varying the speed of both the engine and the generator in accordance with the load demand or torque exerted and other control means for maintaining a substantially constant voltage regardless of varying current output and varying speed, within the limit of the capacity of the system. While the best mode in which I have contemplated applying the principles of my invention is shown in the accompanying drawings, these are to be taken as merely illustrative for it is intended that the patent shall cover by suitable expression in the appended claims whatever features of patentable novelty exist in the invention disclosed.

Figure 1:
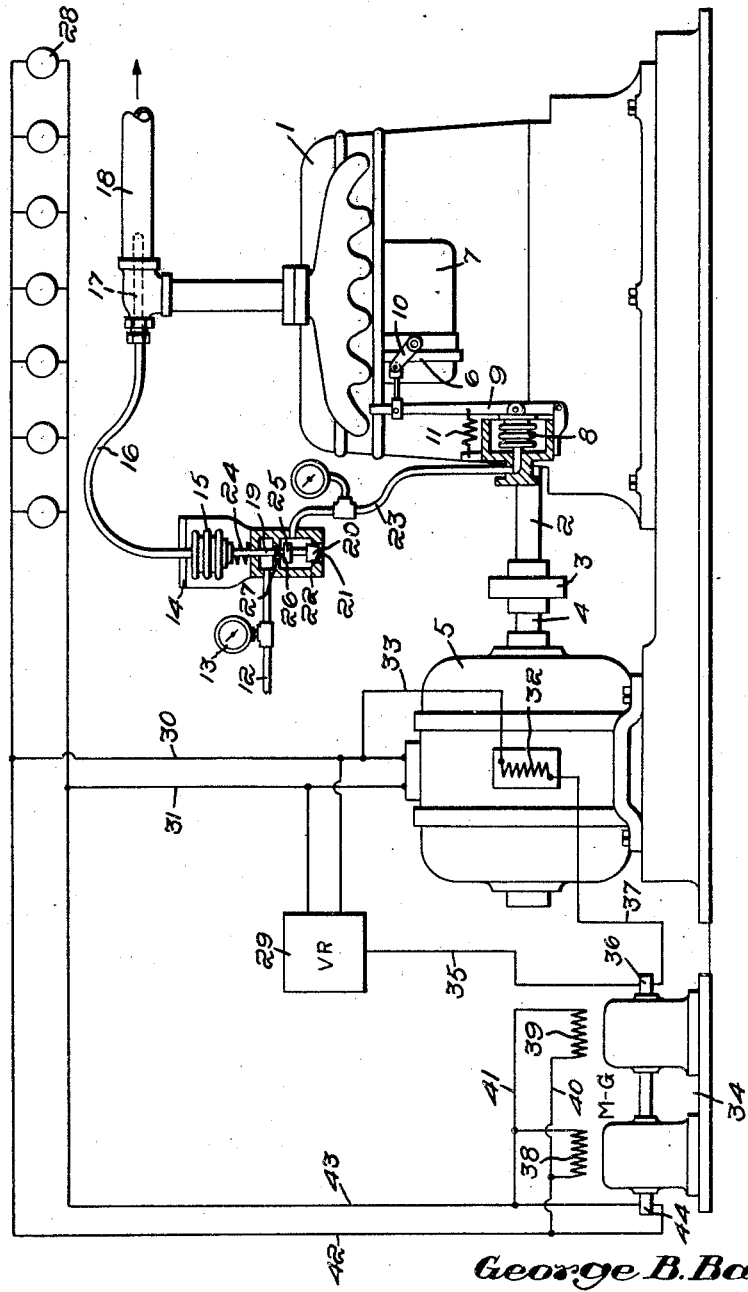
Figure 1 is a diagrammatic showing of apparatus embodying my invention.

Referring more particularly to Figure 1 of the drawings, there is disclosed a Diesel internal combustion engine 1 as representative of any prime mover whose drive shaft 2 is suitably connected to a coupling 3 which, in turn, is connected through shaft 4 to a shunt-wound direct current generator 5. Heretofore, it has been customary to drive such a generator at a substantially constant speed to maintain a substantially constant voltage. The present invention involves varying the speed of the generator in accordance with the load demand and this is accomplished by employing a standard adjustable governor mechanism 6 and fuel injection pump 7 on the Diesel engine in conjunction with a diaphragm motor 8 which, through linkage 9 controls the adjustment of the governor mechanism 6 through governor adjustment lever 10. This governor adjustment lever 10 is standard equipment on commercial Diesel engines and will adjust the governor setting all the way from a desired maximum speed setting down to a desired minimum speed setting.

Diaphragm motor 8 may be operated and thus control the governor adjustment lever by any suitable medium such as compressed air, water pressure, vacuum, etc. For the purpose of illustration it will be assumed that compressed air is used. It is to be noted that diaphragm motor 8 will react to the air pressure in such a way that an increase in air pressure will cause the linkage 9 and governor adjustment lever 10 to move in a direction to increase the speed of the engine. On a decrease in air pressure, spring 11 will pull the linkage 9 and the governor adjustment lever 10 back toward the closed position.

As shown, compressed air is delivered at a suitable pressure from a convenient source through tubing 12 (to which is connected a pressure gauge 13) to a thermostatically actuated control device 14. This comprises a bellows 15 connected by tube 16 to a bulb 17 located in the exhaust passage 18 from the engine. As the temperature of the gases changes, a volatile fluid in the bulb 17 expands or contracts and thereby varies the pressure effective in bellows 15. The latter is connected by stem 19 to a valve 20 at its end which controls a vent opening 21 at the bottom of casing 22 to which the air pressure supply tubing 12 is connected. From this casing another tube 23 extends to the diaphragm motor 8.

The action of the device 14 is such that when there is a minimum pressure in bellows 15, due to a low exhaust temperature from the engine, the stem 19 is raised by a spring 24, so that a valve 25 on the stem 19 will close an annular port 26 around the stem in a partition 27 of the casing 22. This prevents flow of any air to the diaphragm motor 8. Under such conditions the engine 1 may be operating at a desired minimum speed. Under such operating conditions, as the load or torque increases the exhaust temperature likewise increases, this being a characteristic of internal combustion engines. This increase in exhaust temperature causes expansion of the bellows and removal of valve 25 from its seat. The air pressure from supply tubing 12 can now enter the lower chamber of casing 22. A portion of this pressure will escape through the vent 21 but the remainder will pass through tube 23 and be imposed on diaphragm motor 8, thus effecting a setting of the governor 6 to produce an increased speed corresponding to the increased load or torque. If the load increases further, resulting in a higher exhaust temperature, bellows 15 will be further expanded and thus move valve 20 to restrict the opening 21 and thereby permit less of the air pressure to escape therethrough. This will cause more pressure to be imposed on diaphragm motor 8 to further increase the speed of the engine to correspond with the increased load. Thus as the load demand on the engine varies its speed is likewise varied and its torque may remain substantially constant.

For normal changes in the electrical load demand of line 28 I provide a voltage regulator 29 connected across the main wires 30 and 31 from the generator. This regulator under certain favorable load conditions might be connected directly to one terminal of the generator shunt field 32 (the other terminal of which is connected to the main wire 31 by the wire 33) but I have found it highly desirable to install a motor-generator set 34 in this connection. That is, from the regulator 29 a wire 35 is connected to the brushes on one armature 36 of the motor-generator set and from these brushes wire 37 runs to the shunt field winding 32 of the generator 5. The motor-generator set is operated to produce a counter-electromotive force to that of the shunt field 32 and the fields 38 and 39 of the motor-generator set are designedly made weak or what is known as unstable. These fields are connected in parallel by wires 40 and 41 with wires 42 and 43 which extend from the load line 28 and are connected to the brushes of another armature 44 of the motor-generator set. Any sudden change in the load on the main line promptly affects the unstable fields 38 and 39 and rapidly varies the counter-electromotive force generated by the motor-generator set. This in turn rapidly changes the excitation of the shunt winding 32 of the generator 5 with the result that the voltage of the current produced by the generator is almost immediately restored as desired. Thus the voltage of the main line remains substantially unchanged even when rapid changes in the load condition occurs.

Accordingly my improved system provides control means whereby the speed of the prime mover is varied in accordance with the variations in the load demand and whereby the voltage of the main line is maintained substantially constant at all times.

Figure 2:
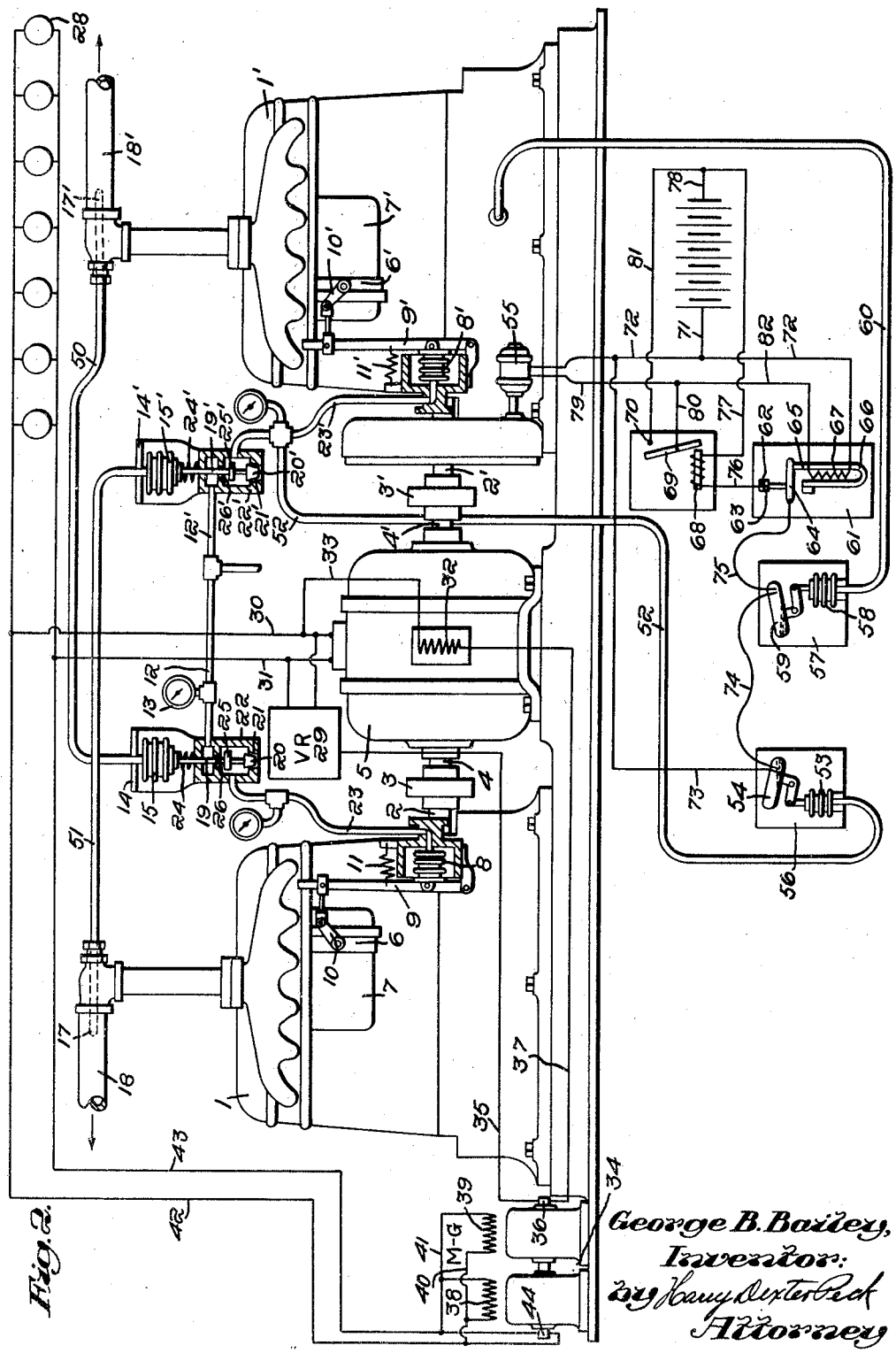
Figure 2 is a diagrammatic illustration of a multiple arrangement of power units, of the type shown in Figure 1, illustrating diagrammatically the manner of interconnecting the control means to provide for a controlled operation of the system.

Figure 2 specifically shows two engines 1 and 1' driving a single shunt-wound direct current generator 5, but this showing is to be taken as illustrative of how several units, each comprising an engine and a generator may be employed to supply the load demand.

In Figure 2 the engine 1 is the same as engine 1 of Figure 1 except shown in reversed order, and the engine 1' is like engine 1 with automatic starting apparatus added thereto. The generator 5 of Figure 2 is the same as generator 5 of Figure 1 except that both ends of its shaft 4 are connected through overrunning or automatic clutch couplings 3 and 3' to the two engines. The voltage regulator 29 and the motor-generator set 34 are the same in both figures. The parts of engine 1' corresponding to the parts of engine 1 are given the same reference numerals with a prime added.

The distinctions to be noted in the disclosure of Figure 2 is that the speed control of engine 1 is governed by the exhaust temperature of engine 1' and vice versa. That is, the thermostatic device 14, connected by tubing 23 to the diaphragm motor 8 of engine 1 is not connected to the exhaust passage 18 of engine 1 but is connected by pipe 50 to the bulb 17' in the exhaust passage 18' of engine 1'. Similarly the thermostatic device 14', connected by tubing 23' with diaphragm motor 8' of engine 1', is connected by pipe 51 to the bulb 17 in the exhaust passage 18 of engine 1. Engine 1 is started manually and as load is imposed above a desired maximum the temperature of its exhaust gases acting on bulb 17 cause the bellows 15' of device 14' to expand and admit air pressure from the supply 12' to casing 22'. Although the vent opening from this casing will be open, sufficient air pressure is transmitted through an auxiliary pipe 52 to expand the bellows 53 and tilt a Mercoid tube 54 to close a circuit through starter motor 55 and thus effect starting of engine 1'.

This starting circuit comprises not only the pressure switch 56, embodying the bellows 53 and Mercoid 54, but also another pressure switch 57, having likewise a bellows 58 and a Mercoid 59. This latter bellows 58 is connected by tubing 60 with the oiling system of engine 1'. If this engine is inactive Mercoid 59 will be tilted so that its mercury charge spans its contact points and thus the circuit so far as switch 57 is concerned is closed. Upon starting of engine 1', however, the oil pressure developed acts upon bellows 58 to tilt Mercoid 59 to its open position. The starting circuit also comprises a thermostatic time switch 61. This has a fixed contact point 62 and a movable contact point 63 mounted on a pivoted arm 64 which normally rests on the free leg 65 of a thermostatic U-shaped member 66. Associated with this latter is a heating coil 67 arranged to heat the thermostatic member and thereby cause its free leg 65 to swing from under the pivoted arm 64 allowing the latter to fall and thus separate the contact points 62 and 63. Finally the starting circuit also comprises a solenoid 68 which upon being energized causes a contact lever 69 to make contact with a fixed contact point 70.

Upon the tilting of Mercoid 54, current will flow from a storage battery along the following circuit: wires 71, 72 and 73 to Mercoid 54, thence by wire 74 to the other Mercoid 59, along wire 75 to the contacts 62 and 63 of time switch 61, thence by wire 76 to the coil of solenoid 68 and thence by wires 77 and 78 to the battery. The consequent energization of solenoid 68 closes contacts 69 and 70 to establish a circuit through the starter motor 55 as follows: from battery 56 through wires 71 and 72 to the motor 55, thence by wires 79 and 80 to contacts 69 and 70, and thence by wires 81 and 78 to the battery. A parallel circuit is also closed by the closing of contacts 69 and 70 as follows: from battery 56 through wires 71 and 72 to the heating coil 67 of the time switch, thence by wires 82 and 80 to contacts 69 and 70, and thence by wires 81 and 78 to the battery.

If the engine 1' is promptly started, the oil pressure transmitted through tubing 60 to bellows 58 tilts the Mercoid 59 to break the starting circuit and thus de-energize solenoid 68. This causes contacts 69 and 70 to open and break the circuit through the starting motor. If for any reason the engine 1' should not start the continued flow of current through the heating coil 67 of the time switch will cause the free leg of the latter to swing clear of arm 64 and allow the latter to fall. This will break the starting circuit by opening contact points 62 and 63, de-energize solenoid 68 and thus bring about the opening of contact points 69 and 70 to break the circuit through the starter motor 55. As the arm 64 falls it prevents the return of the free leg 65 of the U-member and the latter likewise prevents the return of the arm 64 to its circuit-closing position. Accordingly the time switch must be manually reset, before which the trouble which prevented the starting of engine 1' will have been determined and corrected.

Following the starting of engine 1' as the load further increases above another desired maximum the exhaust temperature of engine 1' rises and effects the contents of bulb 17' to impose presure on bellows 15 of the control unit connected by pipe 23 to the diaphragm motor 8 of engine 1. Thus the speed of engine 1 will be varied in accordance with the exhaust temperature of engine 1'. Since variation of the load demand on line 28 tends to slow up the generator 5 and consequently both engines 1 and 1', the governors 6, 6' respond to supply more fuel to the engines. This causes both of their exhaust temperatures to rise and respectively affect the thermostatic devices 14' and 14, which thereupon function to vary the governor adjustment of both engines to correspond with the variation in the load demand. Under these conditions both control systems of both engines may be operating in unison so that they will operate with equal torque and their speeds varying in accordance with the demand.

The voltage regulator 29 and the motor-generator set or what might be termed the voltage stabilizer 34, act as hereinbefore described to maintain the voltage substantially constant. If, instead of a single generator 5 connected to two engines, each engine was connected to a separate generator, the two generators would be connected in parallel with the main line and their respective shunt field windings would be also connected in parallel and in turn in series with the voltage regulator and the voltage stabilizer. In like manner any number of engines and generators could be employed to share the load, in which event all the engines would continue to run at the torque condition corresponding to their maximum efficiency and at a speed determined by the load demand. And at all times the voltage in the main line would remain substantially constant.

I claim:

1. The combination of an internal combustion engine, a shunt-wound direct current generator driven thereby, control means responsive to variations in the fuel burned by the engine for varying the speed of the engine in accordance with changes in the load demand on the generator, and means associated with the shunt field winding of the generator for maintaining the voltage substantially constant regardless of variations in the speed of the generator.

2. The combination of an internal combustion engine, a shunt-wound direct current generator driven thereby, control means responsive to the quantity of fuel in the fuel-air mixture of the engine for varying the speed of the engine and generator in accordance with variations in the load demand and other control means associated with the shunt field winding of the generator for maintaining the voltage substantially constant regardless of variations in the speed of the generator.

3. The combination of an internal combustion engine, a variable speed constant voltage direct current generator driven thereby, means responsive to the exhaust temperature of the engine for controlling the speed of the engine and generator in accordance with variations in the load demand, and voltage regulating means connected with the shunt field winding of the generator for maintaining the voltage substantially constant regardless of the variations in speed.

4. The combination of an internal combustion engine, a shunt-wound direct current electric generator driven thereby, thermostatic means responsive to exhaust temperature for controlling the speed of the engine and generator in accordance with variations in the load demand, and voltage regulating means connected with the shunt field winding of the generator for maintaining the voltage substantially constant regardless of the variations in speed.

5. The combination of an internal combustion engine, a shunt-wound direct current electric generator driven thereby, governing mechanism controlling the fuel input to said engine, thermostatic responsive means actuated by the temperature of the exhaust gases of said engine and being operatively connected with said governor mechanism for actuating said mechanism to vary the speed of said engine in accordance with the load demand, and voltage regulating means connected with the shunt field winding of the generator for maintaining the voltage substantially constant regardless of the variations in speed.

6. The combination of an internal combustion engine, a shunt-wound direct current electric generator driven thereby, a thermostatic device connected to the exhaust passage of said engine and responsive to the exhaust temperature therein, means actuated by said device for varying the speed of said engine in accordance with the load demand, and voltage regulating means including a voltage regulator connected to the main circuit from the generator and connected also to the shunt field winding thereof; there being in the last said connection a motor-generator set providing an electromotive force in said shunt field circuit counter to that set up by the generator itself whereby the voltage output of the generator is maintained substantially constant regardless of the variations in speed of the generator consequent upon the variations in speed of the engine.

7. The combination of an internal combustion engine, a variable speed constant voltage direct current generator driven thereby comprising a shunt field, control means actuated in accordance with variations in the quantity of fuel in the fuel-air mixture supplied to said engine for varying the speed of said engine and generator in accordance with variations in the load demand, and voltage regulating means connected with said shunt field for maintaining the voltage substantially constant regardless of variations in speed.

GEORGE B. BAILEY.